(12) United States Patent
Kizuki

(10) Patent No.: US 9,514,618 B2
(45) Date of Patent: Dec. 6, 2016

(54) SIGNALING SYSTEM, SIGNALING METHOD, AND SERVER

(71) Applicant: Sharp Kabushiki Kaisha, Osaka-shi, Osaka (JP)

(72) Inventor: Hideaki Kizuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 44 days.

(21) Appl. No.: 14/370,664

(22) PCT Filed: Sep. 19, 2012

(86) PCT No.: PCT/JP2012/073944
§ 371 (c)(1),
(2) Date: Jul. 3, 2014

(87) PCT Pub. No.: WO2013/114663
PCT Pub. Date: Aug. 8, 2013

(65) Prior Publication Data
US 2015/0002291 A1 Jan. 1, 2015

(30) Foreign Application Priority Data
Feb. 3, 2012 (JP) ................. 2012-022413

(51) Int. Cl.
| | | |
|---|---|---|
| G08B 1/08 | (2006.01) | |
| G05B 19/00 | (2006.01) | |
| G05B 23/00 | (2006.01) | |
| G05B 11/01 | (2006.01) | |
| H04M 3/51 | (2006.01) | |

(Continued)

(52) U.S. Cl.
CPC ............ *G08B 1/08* (2013.01); *H04M 1/72533* (2013.01); *H04M 3/5166* (2013.01); *H04Q 9/00* (2013.01); *H04M 11/02* (2013.01); *H04Q 2209/47* (2013.01)

(58) Field of Classification Search
CPC ........................................................ H04L 9/32
See application file for complete search history.

(56) References Cited

U.S. PATENT DOCUMENTS

| | | | | |
|---|---|---|---|---|
| 6,430,273 | B1 * | 8/2002 | Shaheen | ............. H04L 12/2856 370/480 |
| 2003/0069848 | A1 * | 4/2003 | Larson | .................... H04L 41/22 705/50 |

(Continued)

FOREIGN PATENT DOCUMENTS

| | | |
|---|---|---|
| JP | 2003-126590 A | 5/2003 |
| JP | 2003-162626 A | 6/2003 |

(Continued)

OTHER PUBLICATIONS

International Search Report issued in PCT/JP2012/073944, mailed on Oct. 30, 2012.

*Primary Examiner* — Jennifer Mehmood
*Assistant Examiner* — Pameshanand Mahase
(74) *Attorney, Agent, or Firm* — Birch, Stewart, Kolasch & Birch, LLP

(57) ABSTRACT

A signaling system according to one embodiment of the present invention includes: a first device configured to transmit signaling order information indicating a signaling order, to a second device different from the first device; and a second device configured to signal a message based on the signaling order information.

5 Claims, 9 Drawing Sheets

(51) Int. Cl.
*H04M 1/725* (2006.01)
*H04Q 9/00* (2006.01)
*H04M 11/02* (2006.01)

(56) References Cited

U.S. PATENT DOCUMENTS

| | | | |
|---|---|---|---|
| 2006/0176240 A1 | 8/2006 | Nozaki et al. | |
| 2006/0245303 A1* | 11/2006 | Varon | G04F 1/005 |
| | | | 368/109 |
| 2007/0079136 A1* | 4/2007 | Vishik | G06Q 20/0855 |
| | | | 713/186 |
| 2011/0250895 A1* | 10/2011 | Wohlert | H04W 4/16 |
| | | | 455/445 |
| 2011/0304428 A1* | 12/2011 | Motoyama | G07C 9/00111 |
| | | | 340/5.74 |
| 2013/0049607 A1 | 2/2013 | Urata | |
| 2014/0126425 A1* | 5/2014 | Burd | H04L 12/4633 |
| | | | 370/255 |

FOREIGN PATENT DOCUMENTS

| | | |
|---|---|---|
| JP | 2005-078470 A | 3/2005 |
| WO | WO 2008/013012 A1 | 1/2008 |
| WO | WO 2011/145381 A1 | 11/2011 |

\* cited by examiner

SIGNALING SYSTEM, SIGNALING METHOD, AND SERVER

TECHNICAL FIELD

The present invention relates to a signaling system, a signaling method, and a server.

Priority is claimed on Japanese Patent Application No. 2012-022413, filed Feb. 3, 2012, the content of which is incorporated herein by reference.

BACKGROUND ART

Each home appliance signals a message, such as reception of a mail, arrival of a guest, or end of automatic washing. Each appliance, as a signal source (such as a mobile terminal device, an interphone, or a washing machine), signals a message by outputting a sound, such as a voice, a melody, or a buzzer sound.

For example, Patent Document 1 discloses a washing machine which includes a door that closes an opening through which clothes are thrown, and a door locking device with a self-maintenance function of locking the door to keep the door in a closed state. The washing machine is characterized by performing an operation termination procedure including locking the door by the door locking device. It is disclosed that the washing machine signals a warning to close the door when the door is not closed at the time of performing the operation termination procedure including locking the door.

CITATION LIST

Patent Document

[Patent Document 1] Japanese Patent Laid-Open Publication No. 2003-126590

DISCLOSURE OF THE INVENTION

Problems to be Solved by the Invention

However, for example, even if a washing machine signals with sound that washing has been completed while a user is cooking in a kitchen, the user cannot hear the sound in some cases. In other words, when the user is away from an appliance, there is a case where the user cannot hear the signal sound and thereby fails to notice the signal from the appliance.

For this reason, the present invention provides a signaling system and a signaling method enabling a user to notice a signal from an appliance even if the user is away therefrom.

Means for Solving the Problems (1) A signaling system according to one embodiment of the present invention includes: a first device configured to transmit signaling order information indicating a signaling order, to a second device different from the first device; and a second device configured to signal a message based on the signaling order information.

(2) The above signaling system may further include: a specifying unit configured to specify the second device, a user of which is present within a signaling available area, as a particular signaling device that signals a message; and a signaling control unit configured to have the particular signaling device specified by the specifying unit signal a message.

(3) Regarding the above signaling system, the first device may include a first obtaining unit configured to obtain user identification information that identifies a user. The second device may include a second obtaining unit configured to obtain the user identification information. The specifying unit may be configured to, in a case that the user identification information obtained by the first obtaining unit is identical to the user identification information obtained by the second obtaining unit, specify as the particular signaling device, the second device including the second obtaining unit having obtained the user identification information.

(4) The above signaling system may further include a server device including the specifying unit. The first device may be configured to transmit to the server device, signaling order information indicating a signaling order, and the user identification information obtained by the first obtaining unit. The second device may be configured to transmit to the server device, the user identification information obtained by the second obtaining unit. The specifying unit included in the server device may include: a storing control unit configured to have a storing unit store the user identification information transmitted by the second device and signaling device identification information that identifies the second device while associating the user identification information with the signaling device identification information; and a retrieving unit configured to retrieve from the storing unit, signaling device identification information associated with the user identification information transmitted from the first device. The signaling control unit may be configured to have the signaling order information transmitted to a signaling device indicated by the signaling device identification information retrieved by the retrieving unit.

(5) Regarding the above signaling system, the second device may include a motion detecting unit configured to detect that a person is present within a predetermined area. The specifying unit may be configured to, in a case that the motion detecting unit detects presence of a person, specify as the particular signaling device, the second device including the motion detecting unit.

(6) Regarding the above signaling system, the second device may be configured to include in a message to be signaled, information indicating that the first device is a signal source, and signal the message.

(7) A signaling method according to another embodiment of the present invention includes: a step for a first device to transmit signaling order information indicating a signaling order, to a second device different from the first device; and a step for the second device to signal a message based on the signaling order information.

Effects of the Invention

According to the embodiments of the present invention, a user can notice a signal from an appliance even if the user is away therefrom.

BEST MODE FOR CARRYING OUT THE INVENTION

Figure 1:
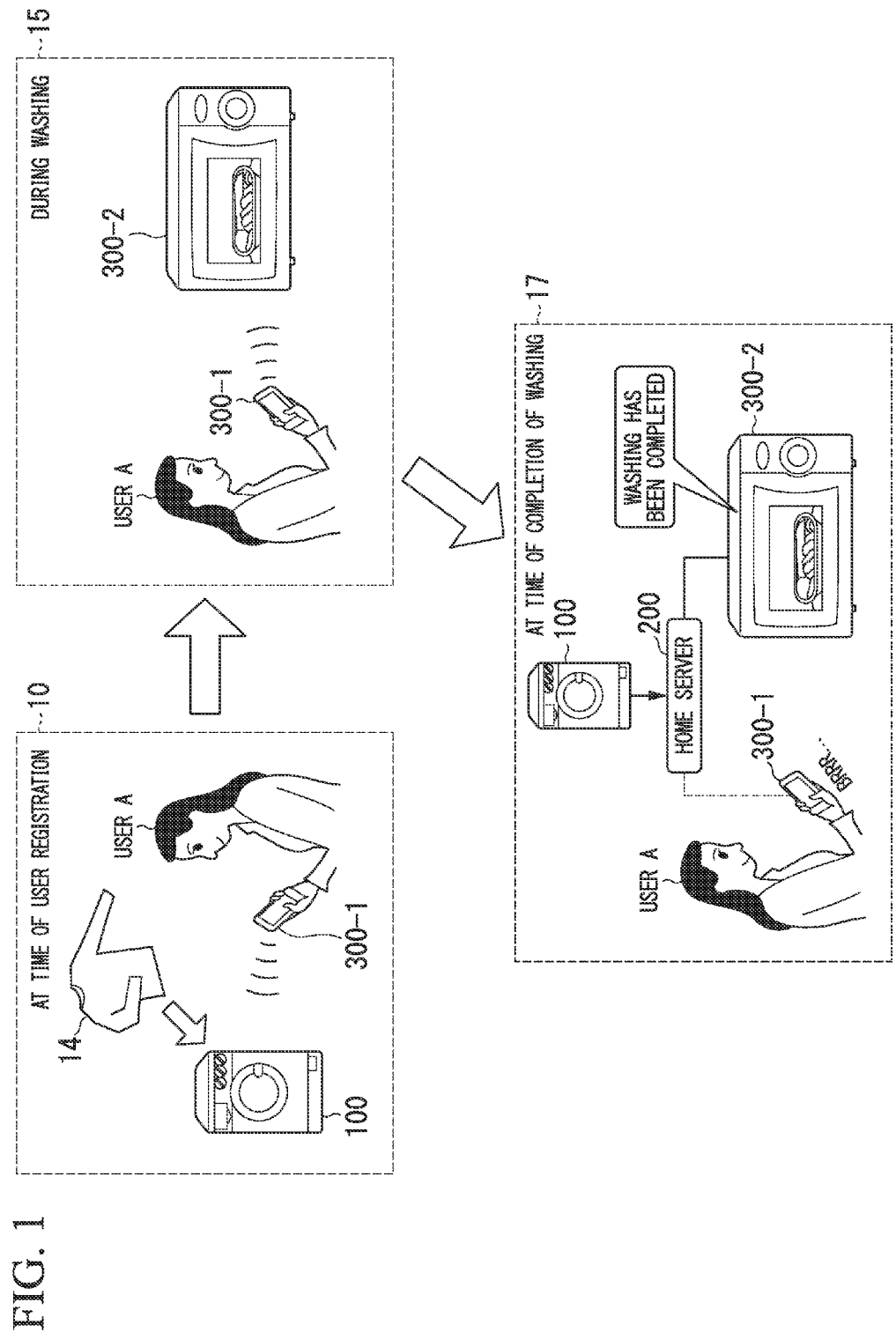
FIG. 1 is a diagram illustrating a summary of processing according to one embodiment of the present invention.

Hereinafter, one embodiment of the present invention will be described with reference to drawings. FIG. 1 is a diagram illustrating a summary of processing according to the present embodiment. FIG. 1 assumes a scene where a user does the laundry with a washing machine provided at a washroom. FIG. 1 illustrates an example of processing at the time of user registration 10, an example of processing during washing 15, and an example of processing at the time of completion of the washing 17.

It is shown in FIG. 1 that at the time of the user registration 10, a user A throws a cloth 14 into a washing machine 100 at home, and the washing machine 100 receives wireless waves transmitted from a mobile terminal device 300-1 of the user A to read user identification information that identifies the user A. Thus, the washing machine 100 stores the user identification information. Thereafter, the user presses a start button of the washing machine, and thus the washing machine 100 initiates washing.

Additionally, it is shown in FIG. 1 that at the time during the washing 15, the mobile terminal device 300-1 of the user A wirelessly transmits using a wireless system such as a wireless LAN, the user identification information of the user A along with recipe information to a microwave 300-2 in the home of the user. Here, the recipe information is information showing a cooking recipe (cooking method). In this example, the microwave 300-2 receives the user identification information and transmits the received user identification information to, for example, a home server 200 provided at the home of the user. Then, the home server 200 stores the user identification information and signaling device identification information that identifies the microwave 300-2 while associating the user identification information with the signaling device identification information. Additionally, the home server 200 stores signaling device identification information that identifies the mobile terminal device 300-1 and an IP address of the signaling device while associating the signaling device identification information with the IP address.

Further, it is shown in FIG. 1 that at the time of completion of washing 17, when the washing machine 100 completes the washing, the mobile terminal device 300-1 vibrates a vibrator included therein, thereby signaling the user A that the washing has been completed. Moreover, it is shown in FIG. 1 that when the washing machine 100 completes the washing, the microwave 300-2 signals the user A that "the washing has been completed" by outputting voice from a speaker included therein.

In this example, the washing machine 100 wirelessly transmits the signal that the washing has been completed and the user identification to the home server 200, using the wireless system such as the wireless LAN. The home server 200 reads the IP address of the mobile terminal device 300-1 associated with the user identification wirelessly received from the washing machine 100. Then, the home server 200 transmits to the IP address of the read mobile terminal device 300-1, the signal that the washing has been completed. Then, upon receiving the signal that the washing has been completed, the mobile terminal device 300-1 vibrates.

Additionally, the home server 200 refers to the signaling device identification information of the microwave 300-2 associated with the user identification information received from the washing machine 100, and reads the IP address of the microwave 300-2 associated with the signaling device identification information. Then, the home server 200 specifies the IP address of the microwave 300-2 and wirelessly transmits to the microwave 300-2, the signal that the washing has been completed. Then, upon receiving from the server 200, the signal that the washing has been completed, the microwave 300-2 outputs a voice message "the washing has been completed".

Figure 2:
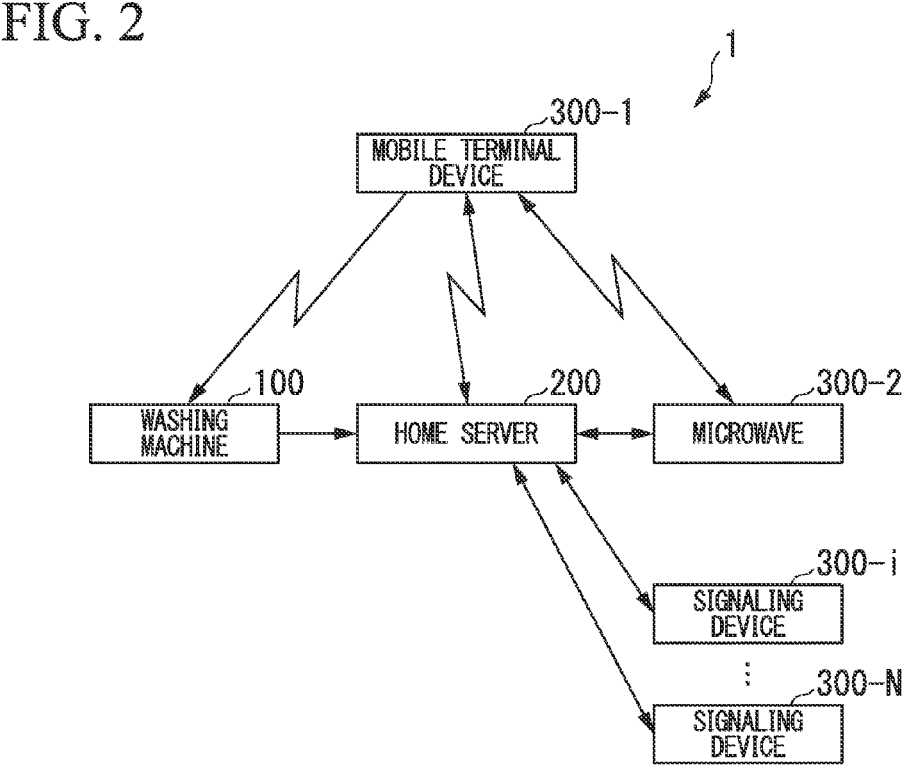
FIG. 2 is a schematic block diagram illustrating a signaling system according to the present embodiment.

FIG. 2 is a schematic block diagram illustrating a signaling system 1 according to the present embodiment. The signaling system 1 includes a washing machine (first device) 100, a home server (server device) 200, a mobile terminal device 300-1, a microwave 300-2, a signaling device (second device) 300-3, . . . , and a signaling device (second device) 300-N (N is a positive integer). Here, the washing machine 100 is one example of a transmission device. Additionally, the mobile terminal device 300-1 and the microwave 300-2 are examples of signaling devices that signal a target user to be signaled of a message. In other words, the signaling system 1 includes N signaling devices (second devices) 300-$i$ ($i$ is an integer such that $i=1, \ldots, N$).

The transmission device transmits, in a case where a predetermined signaling condition (for example, completion of washing) is met, signaling order information indicating an order to signal (for example, that washing has been completed), to a particular signaling device 300-$i$ via the home server 200. The signaling device 300-$i$ signals a message based on the signaling order information transmitted by the transmission device. In other words, the washing machine (first device) 100 transmits, in the case where the predetermined signaling condition (for example, in a case where washing has been completed) is met, the signaling order information indicating an order to signal a message, to a signaling device (second device) 300-*i* other than the washing machine 100. Then, the signaling device (second device) 300-*i* signals a message based on the signaling order information.

Additionally, it is assumed in the present embodiment that, in a case where each device wirelessly transmits data, a wireless LAN is used as one example. Here, the signaling device 300-*i* may include in a message to be signaled, information that the washing machine 100 is the signal source.

The washing machine 100 reads user identification information stored by the mobile terminal device 300-1, and stores the read user identification information in a storing unit included in the washing machine 100. Thus, the washing machine 100 can store the user identification information of a user to be signaled of a signaling order (for example, an order to signal that washing has been completed or an order to signal that an error has occurred).

Then, in the case where the predetermined signaling condition (for example, in a case where washing has been completed) is met, the washing machine 100 wirelessly transmits to the home server 200, signaling order information associated with the signaling condition, and the user identification information.

The mobile terminal device 300-1 wirelessly transmits to the microwave 300-2, the user identification information along with the recipe information. Here, in a case where the mobile terminal device 300-1 is present within a predetermined distance from the microwave 300-2 (hereinafter also referred to as "within a proximity area"), the microwave 300-2 may read the user identification information from the mobile terminal device 300-1 by proximity detection, such as NFC (near field communication) or RFID (radio frequency identification).

The microwave 300-2 receives user identification information transmitted from the mobile terminal device 300-1 and wirelessly transmits the received user identification information to the home server 200.

In a case where the mobile terminal device 300-1 is present within a predetermined distance (hereinafter also referred to as "within a proximity area"), the signaling device 300-*i* (here, i is an integer such that i=3, . . . , N) reads the user identification information from the mobile terminal device 300-1 by proximity detection, such as NFC or RFID. Then, the signaling device 300-*i* wirelessly transmits the read user identification information to the home server 200.

In a case where the user identification information is received from the mobile terminal device 300-1, the home server 200 stores the received user identification information, the signaling device identification information that identifies the mobile terminal device 300-1, and the IP address of the mobile terminal device 300-1 while associating those information to one another.

In a case where the user identification information is received from the microwave 300-2, the home server 200 stores in the storing unit included therein, the received user identification information, the signaling device identification information that identifies the microwave 300-2, and the IP address of the microwave 300-2 while associating those information to one another. Thus, the home server 200 can recognize that the user identified by the user identification information is present nearby the microwave.

Then, in a case where the signaling order information and the user identification information are received from the washing machine 100, the home server 200 reads an IP address associated with the user identification information (for example, the IP address of the microwave 300-2). Then, the home server 200 specifies the read IP address and transmits to the microwave 300-2, the signaling order information received from the washing machine 100.

In a case where the signaling order information is received from the home server 200, the mobile terminal device 300-1 vibrates in a vibration pattern in accordance with the signaling order information. Here, the vibration pattern means a pattern (manner) of a temporal variation in vibration strength.

In a case where the signaling order information is received from the home server 200, the microwave 300-2 signals with voice the signaling order indicated by the signaling order information.

Additionally, in a case where the signaling order information and the user identification information are received from the washing machine 100, the home server 200 reads the IP address of the mobile terminal device 300-1 associated with the user identification information. Then, the home server 200 specifies the IP address of the mobile terminal device 300-1 and wirelessly transmits to the mobile terminal device 300-1, the signaling order information received from the washing machine 100.

Here, the user may set, on an operation display of the washing machine, a user to be signaled of "completion of washing" or "occurrence of an error", which signal is to be transmitted from the washing machine. The user to be signaled of a message is not limited to one user, and multiple users or all the users may be signaled of the message.

Additionally, the washing machine 100 may, as conventionally performed, output a voice or the like at the same time of performing the signaling process, thus signaling the user of the message.

The mobile terminal device 300-1 may use not only vibration, but also display or voice, to signal the user of the signaling order such as "completion of washing" or "occurrence of an error". The display is performed by a display device provided on the mobile terminal device, and the voice is output from a speaker provided on the mobile terminal device.

The microwave 300-2 may use not only voice, but also display or vibration, to signal the user of the signaling order such as "completion of washing" or "occurrence of an error". The display or vibration is performed by a display device or vibration device provided on the microwave 300-2.

Additionally, other signaling devices 300-*i* (here, i is an integer such that i=3, . . . , N) may use display, voice, or vibration to signal the user of "completion of washing" or "occurrence of an error".

Further, the home server 200 may select any one of the above signaling methods (for example, display, voice, and vibration). In this case, the home server 200 may transmit to each signaling device 300-*i*, signaling device identification information that identifies a signaling device to be a signal destination and signaling method information indicating a signaling method. In this case, the home server 200 may store an optimal signaling method for each signaling device 300-*i*, so that the home server 200 reads the optimal signaling method in accordance with the signaling device 300-*i* and transmits signaling method information indicating the read optimal signaling method to the signaling device 300-*i*. Thus, each signaling device 300-*i* can signal a message by the signaling method indicated by the signaling method information. Additionally, each signaling device 300-*i* can signal a message by the signaling method optimal for that signaling device 300-*i*.

Figure 3:
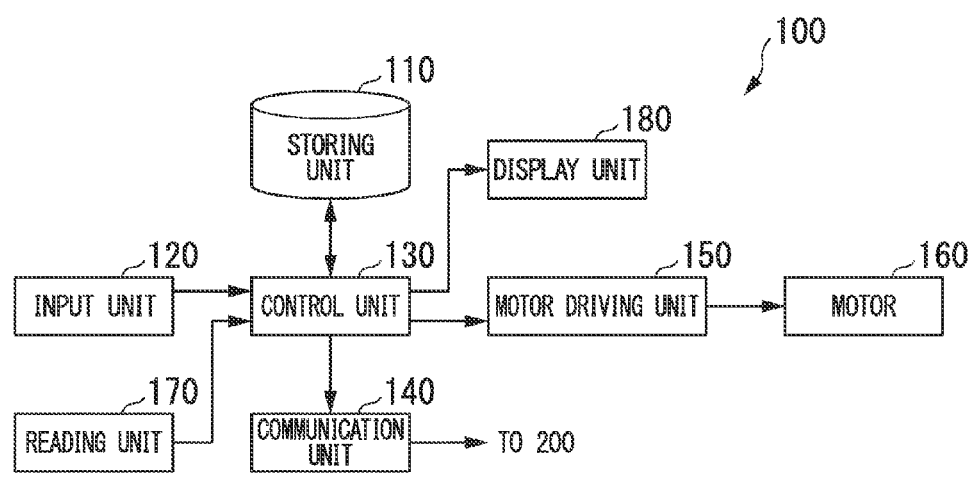
FIG. 3 is a schematic block diagram illustrating a washing machine according to the present embodiment.

FIG. 3 is a schematic block diagram illustrating the washing machine 100 according to the present embodiment. The washing machine 100 includes a storing unit 110, an input unit 120, a control unit 130, a communication unit 140, a motor driving unit 150, a motor 160, a reading unit (first obtaining unit) 170, and a display unit 180.

The storing unit 110 stores various programs to be read and executed by the control unit 130. The storing unit 110 can temporarily store received information other than the various programs.

The input unit 120 receives an input from the user (for example, pressing of a washing start button), and outputs to the control unit 130, input information indicating the received input.

The reading unit 170 reads, by proximity detection based on NFC, the user identification information stored by the mobile terminal device 300-1, and outputs the read user identification information to the control unit 130.

The display unit 180 displays, under control of the control unit 130, setting information, a remaining washing time, and the like.

The control unit 130 controls each unit in accordance with the input information received from the input unit 120. For example, in a case where an input indicating that the washing start button of the washing machine 100 has been pressed is received, the control unit 130 has the motor driving unit 150 drive the motor 160. Thus, the washing machine 100 initiates washing.

Additionally, the control unit 130 has the storing unit 110 store the user identification information received from the reading unit 170.

Further, in a case where washing has been completed, or an error has occurred, the control unit 130 reads the user identification information from the storing unit 110 and has the communication unit 140 wirelessly transmit to the home server 200, the read user identification information and signaling order information indicating that signaling order (for example, completion of washing or occurrence of an error).

Figure 4:
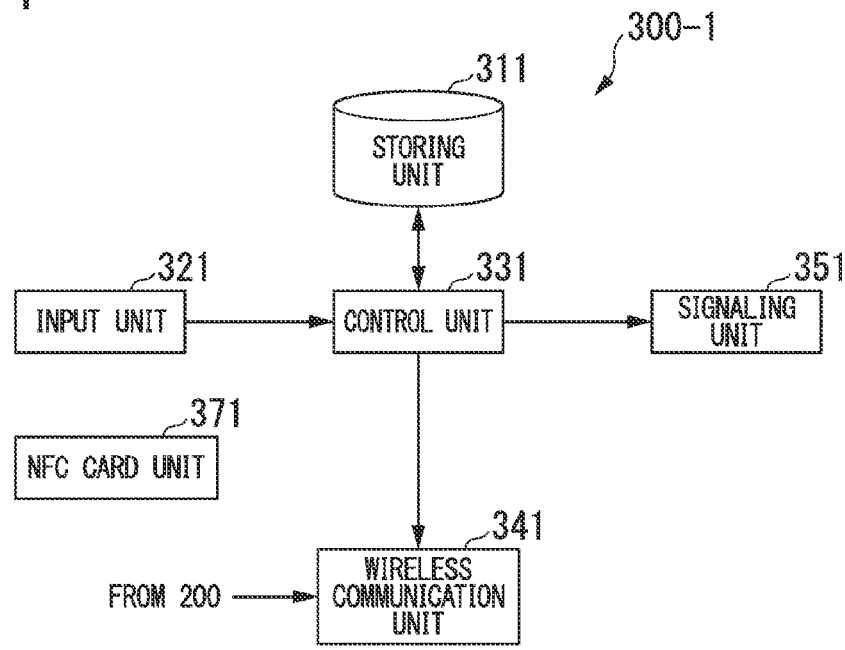
FIG. 4 is a schematic block diagram illustrating a mobile terminal device according to the present embodiment.

FIG. 4 is a schematic block diagram illustrating the mobile terminal device 300-1 according to the present embodiment. The mobile terminal device 300-1 includes a storing unit 311, an input unit 321, a control unit 331, a wireless communication unit 341, a signaling unit 351, and an NFC card unit 371.

The storing unit 311 stores a program to be read and executed by the control unit 331.

Additionally, the input unit 321 receives an input from a user and outputs to the control unit 331, input information indicating the received input.

The wireless communication unit 341 wirelessly receives signaling order information from the home server 200 and outputs the received signaling order information to the control unit 331.

The control unit 331 controls each unit in accordance with the input information received from the input unit 321. Additionally, in a case where the wireless communication unit 341 receives signaling order information from the home server 200, the control unit 331 receives the signaling order information from the wireless communication unit 341. Then, based on the received signaling order information, the control unit 331 has the signaling unit 351 signal that information. Specifically, for example, the control unit 331 has the signaling unit 351 vibrate a vibrator of the signaling unit 351 in accordance with a signaling order indicated by the signaling order information. For example, the control unit 331 changes the vibration strength, a vibration length, or a vibration pattern, in accordance with the signaling order. Thus, the user of the mobile terminal device 300-1 detects the vibration, and thereby can recognize whether the signaling order indicates completion of washing or occurrence of an error.

The NFC card unit 371 stores user identification information. The user identification information stored by the NFC card unit 371 is read by the washing machine 100 and the microwave 300-2.

Figure 5:
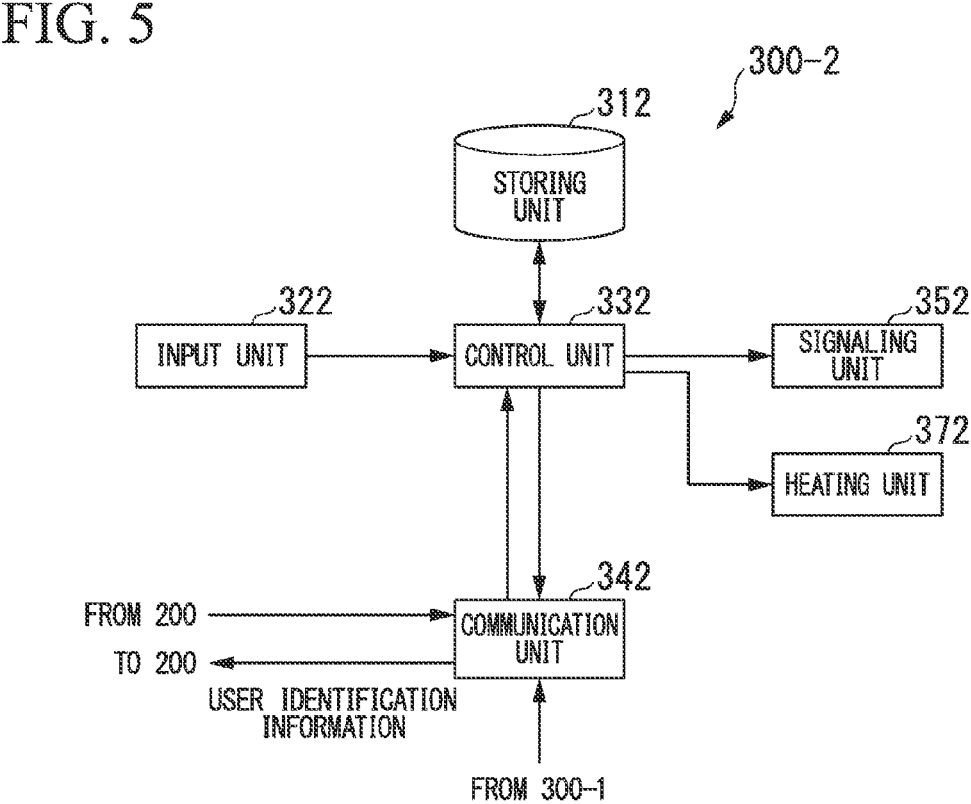
FIG. 5 is a schematic block diagram illustrating a microwave according to the present embodiment.

FIG. 5 is a schematic block diagram illustrating the microwave 300-2 according to the present embodiment. The microwave 300-2 includes a storing unit 312, a control unit 332, a communication unit (second obtaining unit) 342, a signaling unit 352, and a heating unit 372.

The storing unit 312 stores various programs to be read and executed by the control unit 332.

The input unit 322 receives an input from a user and outputs to the control unit 332, input information indicating the received input.

The communication unit 342 wirelessly receives signaling order information from the home server 200 and outputs the received signaling order information to the control unit 332.

In a case where information for instructing initiation of heating is received from the input unit 321, the control unit 332 has the heating unit 372 generate a microwave and heat a substance by mutual interaction between the generated microwave and the substance.

In a case where the communication unit 342 wirelessly receives signaling order information from the home server 200, the control unit 332 receives the signaling order information from the communication unit 342. Then, based on the received signaling order information, the control unit 332 has the signaling unit 352 signal that information. Specifically, for example, in a case where the signaling order information indicates completion of washing, the control unit 332 has a speaker of the signaling unit 352 output a voice message "washing has been completed".

Additionally, the control unit 332 has the storing unit 312 store the user identification information received from the communication unit 342 and recipe information. Further, the control unit 332 has the communication unit 342 wirelessly transmit to the home server 200, the user identification information and signaling device identification information of the microwave 300-2.

Figure 6:
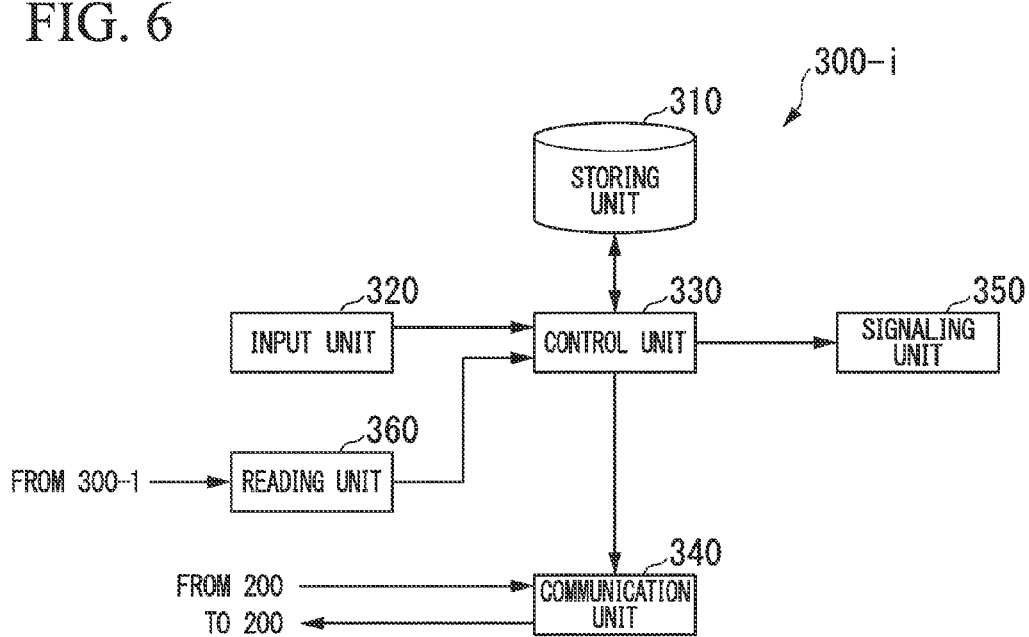
FIG. 6 is a schematic block diagram illustrating a signaling device according to the present embodiment.

FIG. 6 is a schematic block diagram illustrating the signaling device 300-*i* (i is an integer such that i=3, . . . , N) according to the present embodiment. The signaling device 300-*i* includes a storing unit 310, an input unit 320, a control unit 330, a communication unit 340, a signaling unit 350, and a reading unit (second obtaining unit) 360.

The storing unit 310 stores various programs to be read and executed by the control unit 330.

The input unit 320 receives an input from a user and outputs to the control unit 330, input information indicating the received input.

The reading unit 360 reads user identification information from the mobile terminal device 300-1 by proximity detection based on, for example, RFID, and outputs the read user identification information to the control unit 330. The reading unit 360 obtains the user identification information by reading the user identification information from the mobile terminal device 300-1. For this reason, in other words, the reading unit 360 is a second obtaining unit that obtains user identification information.

The communication unit 340 wirelessly receives signaling order information from the home server 200 and outputs the received signaling order information to the control unit 330.

In a case where the communication unit 340 wirelessly receives signaling order information from the home server 200, the control unit 330 receives the signaling order information from the communication unit 340. Then, based on the received signaling order information, the control unit 330 has the signaling unit 350 signal a message. Specifically, for example, in a case where the signaling order information indicates completion of washing, the control unit 330 has the signaling unit 350 output a voice message "washing has been completed". Additionally, as another example, in a case where the signaling order information indicates completion of washing, the control unit 330 has the signaling unit 350 display a message "washing has been completed".

Additionally, the control unit 330 has the communication unit 340 wirelessly transmit to the home server 200, the user identification information received from the reading unit 360.

Figure 7:
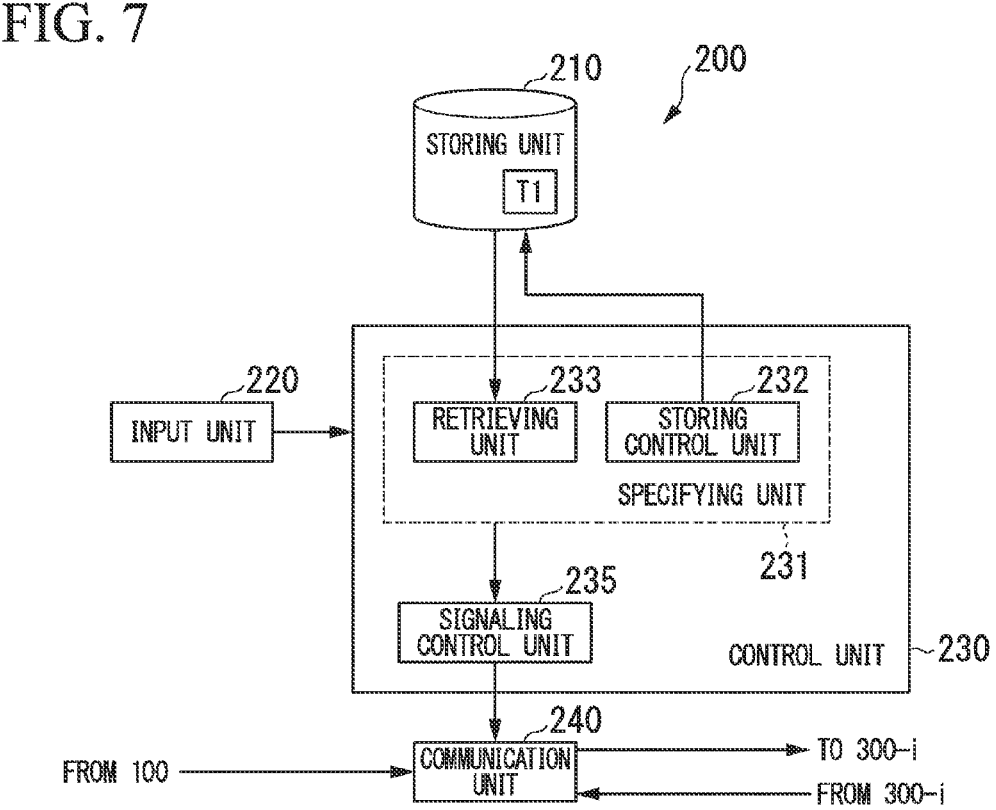
FIG. 7 is a schematic block diagram illustrating a home server according to the present embodiment.

FIG. 7 is a schematic block diagram illustrating the home server 200 according to the present embodiment. The home server 200 includes a storing unit 210, an input unit 220, a control unit 230, and a communication unit 240.

The storing unit 210 stores various programs to be read and executed by the control unit 230.

The input unit 220 receives an input from a user and outputs to the control unit 230, input information indicating the received input.

The communication unit 240 receives signaling order information and user identification information which are wirelessly transmitted from the washing machine 100 and outputs the received information to the control unit 230. Additionally, the communication unit 240 receives the user identification information and the signaling device identification information of the signaling device 300-i which are wirelessly transmitted from the signaling device 300-i, and outputs the user identification information and the signaling device identification information to the control unit 230.

Additionally, the communication unit 240 wirelessly transmit, under control of the control unit 230, the aforementioned signaling order information to a particular signaling device specified by the control unit 230 as a signal destination.

The control unit 230 controls each unit based on input information received from the input unit 220. The control unit 230 includes a specifying unit 231 and a signaling control unit 235. The specifying unit 231 specifies as a particular signaling device, a signaling device whose user is present within a signaling available area. Here, the particular signaling device means a device configured to signal a message based on the signaling order information transmitted by the transmission device.

More specifically, in a case where the user identification information obtained by the reading unit (first obtaining unit) 170 included in the transmission device is identical to the user identification information obtained by the communication unit (second obtaining unit) 342, the specifying unit 231 specifies as a particular signaling device, the signaling device including the communication unit (second obtaining unit) 342 having obtained the user identification information.

Here, the specifying unit 231 includes a storing control unit 232 and a retrieving unit 233.

In a case where the communication unit 240 receives the user identification information and the signaling device identification information of the signaling device 300-i (for example, the microwave 300-2) which are wirelessly transmitted from the signaling device 300-i (for example, the microwave 300-2), the storing control unit 232 has the storing unit 210 store the user identification information transmitted from the signaling device 300-i and the signaling device identification information that identifies the signaling device 300-i (hereinafter also referred to as "proximity device identification information") while associating those information to each other.

In a case where the communication unit 240 receives the signaling order information and the user identification information which are wirelessly transmitted from the washing machine 100, the retrieving unit 233 retrieves from the storing unit 210, signaling device identification information associated with the user identification information transmitted from the washing machine (transmission device) 100.

The signaling control unit 235 has the particular signaling device specified by the specifying unit 231 signal a message based on the signaling order information. More specifically, the signaling control unit 235 has the communication unit 240 transmit the signaling order information that the communication device 240 has received from the washing machine 100, to the signaling device 300-i indicated by the signaling device identification information retrieved by the retrieving unit 233.

Figure 8:
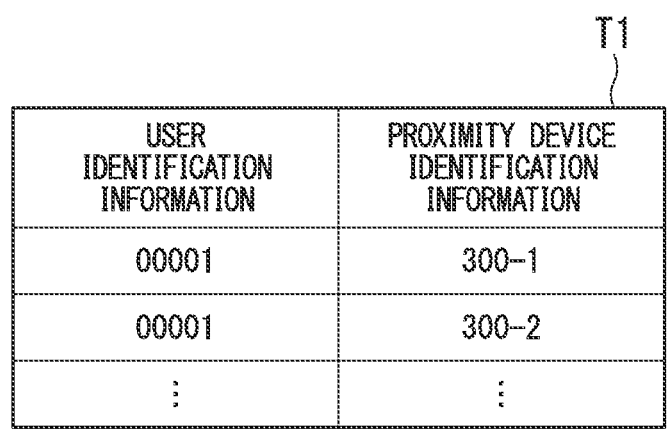
FIG. 8 illustrates an example of a table stored in a storing unit of the home server.

FIG. 8 illustrates one example of a table T1 stored in the storing unit 210 of the home server 200. In the table T1 shown in FIG. 8, pairs of user identification information and proximity device identification information are shown. For example, user identification information is "00001", and proximity device identification information is "300-1".

Figure 9:
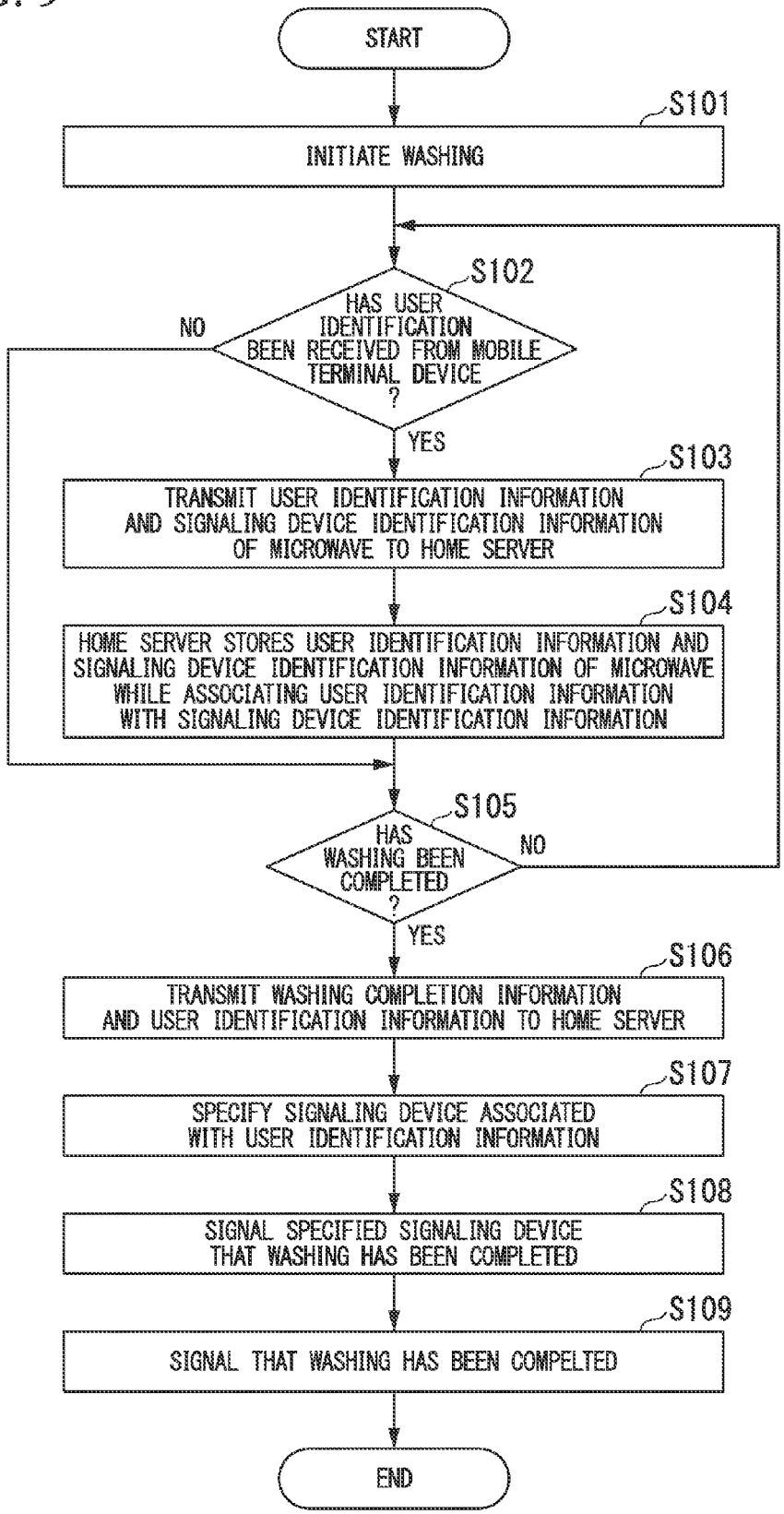
FIG. 9 is a flowchart illustrating processing flow for the signaling system according to the present embodiment.

FIG. 9 is a flowchart illustrating processing flow for the signaling system 1 according to the present embodiment. First, the washing machine 100 initiates washing (step S101). Then, the microwave 300-2 determines whether or not user identification information has been received from the mobile terminal device 300-1 (step S102). If user identification information has not been received (step S102: NO), the signaling system 1 proceeds to a process in step S105. On the other hand, if user identification information has been received (step S102: YES), the user identification information and signaling device identification information of the microwave 300-2 are transmitted to the home server 200 (step S103). Then, the home server 200 stores the user identification information and the signaling device identification information of the microwave while associating those information with each other (step S104), and proceeds to step S105 (step S105).

Then, in step S105, the washing machine 100 determines whether or not the washing has been completed (step S 105). If the washing has not been completed (step S105: NO), the signaling system 1 proceeds to the process in step S102. On the other hand, if the washing has been completed (step S105: YES), the washing machine 100 transmits washing completion information and user identification information to the home server 200 (step S106). Then, the home server 200 specifies the signaling device 300-i associated with the user identification information (step S107). Then, the home server 200 transmits to the specified signaling device 300-i, a signal that the washing has been completed (step S108). Then, the signaling device 300-i receiving the signal that the washing has been completed signals the message that the washing has been completed (step S109). Thus, the processing indicated by the present flowchart ends.

As explained above, in the present embodiment, the washing machine 100 transmits, at the time of sending a signal, signaling order information and user identification information obtained by the reading unit (first obtaining unit) 170 to the home server (server device) 200. The signaling device 300-i transmits to the home server 200, user identification information obtained by the communication unit (second obtaining unit) 342.

In a case where the user identification information obtained by the reading unit (first obtaining unit) 170 is identical to the user identification information obtained by communication unit (second obtaining unit) 342, the home server 200 specifies as a particular signaling device, the signaling device including the communication unit (second obtaining unit) 342 having received the user identification information. Then, the home server 200 has the specified particular signaling device signal a signaling order indicated by the signaling order information. Thus, the user can notice the signal from the washing machine 100 even when the user is away from the washing machine 100. In other words, the user can notice the signal from the transmission device even when the user is away from the transmission device.

Additionally, for example, in a case where the washing machine 100 signals an interphone that washing has been completed, while a target user to be signaled of a message and a co-occupant are present at a living room, and the interphone outputs a sound indicating that the washing has been completed, generally, the unnecessary message is given not only to the target user to be signaled of the message by the washing machine, but also to the co-occupant. In other words, a user who does not need that information is also signaled of the information.

On the other hand, in the present embodiment, only the signaling device nearby a particular user requiring certain information signals the information, thereby preventing a user not requiring that information from being signaled of the information.

Here, although the present embodiment has been described using a washing machine as one example of the transmission device 100 as a signal source, the configuration is not limited thereto. The transmission device 100 is not limited to the above example as long as the transmission device 100 is an electronic device that requires signaling a user of a message. The transmission device 100 may be, for example, a drying machine, an interphone, a telephone, a microwave, a water heater, a security sensor, an air cleaner, an electronic device that executes software (such as a personal computer), or the like. Here, software may be software on the Internet, or software stored by an electronic device. In this case, messages signaled by those devices may be signals indicating timing of component replacement, arrival of a guest, reception of incoming call, end of cooking, completion of preparation, an error, weather forecast, or the like.

Similarly, although the mobile terminal device and the microwave have been described as examples of the signaling devices 300-i that signal users of messages, the configuration is not limited thereto. The signaling device 300-i may be, for example, an electronic device having a signaling function using an image, a voice, vibration, light, or the like, such as a photo frame, an interphone, a washing machine, a telephone, or a refrigerator. Additionally, the signaling device 300-i may be an electronic device that signals a message with a combination of an image, a voice, vibration, light, and the like.

Here, in a case where one of the signaling devices 300-i is a television, a configuration may be made as follows. In a case where a target user to be signaled of a message is watching a television, the home server 200 may transmit to the television, a signaling order (for example, a signaling order indicating completion of washing or a signaling order indicating occurrence of an error), using a communication system, such as a wireless LAN. Thus, the television may display the signaling order. At this time, the event that the user is watching the television may be detected by a sensor, a camera, an RFID reader, or the like, which is provided in the room. Additionally, when the mobile terminal device 300-1 having a remote control function is used for operation of the television, the mobile terminal device 300-1 may transmit the user identification information of the mobile terminal device 300-1 to the television. Here, this user identification information is user identification information of the user using the mobile terminal device 300-1. Thus, the television receives from the mobile terminal device 300-1, the user identification information that identifies the user, and transmits to the home server 200, the received user identification information along with the identification information of the television.

Then, the home server 200 stores the signaling device identification information that identifies the television and the user identification information while associating those information to each other. This means that the home server 200 stores information indicating that the user identified by the user identification information is present nearby the television. Thus, in a case where the signaling order information (for example, a signal that washing has been completed) and the user identification information are received from the washing machine 100, the home server 200 refers to the signaling device identification information associated with the received user identification information, that is, the identification information of the television, thus reading the IP address of the television. Then, the home server 200 may specify the IP address of the television and transmit thereto signaling order information. Thus, the television may display a signaling order indicated by the signaling order information.

Additionally, the home server 200 may be configured to control the signaling timings for multiple signaling devices 300-i so that the signaling devices 300-i alternately output voices. Further, the signaling devices 300-i may be configured to simultaneously output the same voice.

Thus, the home server 200 can avoid a case where multiple signaling devices present in the same room simultaneously output voice messages, thereby making it difficult for a user to hear the voice messages.

Further, in a case where there are multiple users to be signaled of a message, the home server 200 may have signaling devices 300-i registered by the users signal messages simultaneously. Moreover, in a case where a signaling device 300-i can determine whether or not a person is present nearby, using a motion sensor (motion detecting unit) or the like, the signaling device 300-i, around which no one is present, may be configured not to signal a message.

In other words, in a case where a signaling device 300-i includes a motion detecting unit configured to detect whether or not a person is present within a predetermined area, the specifying unit 231 of the home server 200 may, when the motion detecting unit detects the presence of a person, specify as a particular signaling device, the signaling device 300-i including the motion detecting unit.

Thus, when the motion detecting unit detects motion of a person, only the signaling device 300-i having detected the motion signals a message. Thus, for example, the signaling system 1 can prevent the signaling device 300-*i* present nearby a sleeping child from signaling a message, thereby achieving a benefit of preventing the sleeping child from being awakened by sound used to signal the message.

Additionally, the home server 200 may have all signaling devices around which people are present signal messages. Thus, the home server 200 can increase the possibility that a user will notice a signaling order. In this case, the transmission device need not specify a user at the time of setting. On the other hand, the signaling device may confirm whether or not a person is present nearby at the time of signaling a message, and if a person is present nearby, the signaling device may signal a signaling order indicted by the signaling order information.

Further, in the present embodiment, the home server 200 stores signaling device identification information of the signaling device 300-*i* registered by the user and the user identification information while associating those information with each other, and has the signaling device 300-*i* signal a message when signaling order information (for example, a signal that washing has been completed) is received from the washing machine 100. However, the configuration is not limited thereto. The home server 200 may transmit the signaling order information to all the signaling devices 300-*i*, and each signaling device may determine whether or not a user is present nearby the signaling device, and if the user is present nearby the signaling device, the signaling device may signal the user of the signaling order indicated by the signaling order information. Specifically, for example, the above configuration may be implemented by the following two embodiments.

First, the first embodiment is described here. As a premise, each signaling device 300-*i* stores user identification information registered by a user. Under the premise, the home server 200 transmits signaling order information and user identification information to all the signaling devices 300-*i*. Each signaling device 300-*i* may signal a signaling order indicated by the signaling order information received from the home server 200 in a case where the user identification information stored therein is identical to the user identification information received from the home server 200.

Next, the second embodiment is described here. The home server 200 transmits the signaling order information to all the signaling devices 300-*i*. Each signaling device 300-*i* may signal a signaling order indicated by the signaling order information received from the home server 200 in a case where the signaling order information is received and the motion detecting unit detects motion of a person.

Additionally, although the communication system using a wireless LAN has been taken as an example in the present embodiment, the configuration is not limited thereto. Wired communication using Ethernet cables, or wireless communication such as ZigBee (trademark), Z-Wave, or Bluetooth (trademark), may be used.

Further, although the network where the home server serves a center role has been expressly described as an example of a configuration of a network in the above example, the configuration of the network is not limited thereto. One-to-one communication between devices may be used. Alternatively, communication may be made via a server on the Internet.

Here, the home server 200 may have all signaling-available signaling devices signal messages. In this case, the transmission device need not specify a user at the time of setting, and the signaling device also need not specify a user at the time of setting.

In the present embodiment, the process for the reading unit (first reading unit) 170 included in the washing machine 100 to obtain the user identification information is one example, and the user identification information may be obtained as follows.

Figure 10:
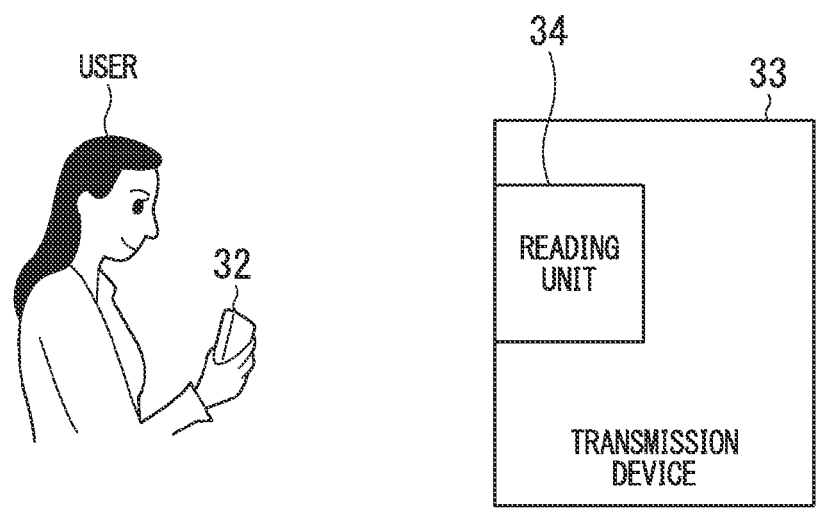
FIG. 10 is a diagram illustrating that a transmission device obtains user identification information by reading the user identification information from an ID tool owned by a user.

FIG. 10 is a diagram illustrating that the transmission device obtains user identification information by reading the user identification information from an ID tool owned by a user. It is shown in FIG. 10 that the user moves an ID tool (for example, an RFID tag, an NFC card, an NFC mobile phone, a barcode card, or the like) 32 close to a reading unit 34 of a transmission device 33, thereby providing the user information to the transmission device 33. In this example, the transmission device 33 may inform the home server 200 or each signaling device 300-*i* of the provided information along with a signaling condition (such as completion of washing).

Additionally, the reading unit 34 is not limited to a sensor configured to perform proximity communication, and may perform infrared communication or communication using a reading sensor such as a barcode.

Figure 11:
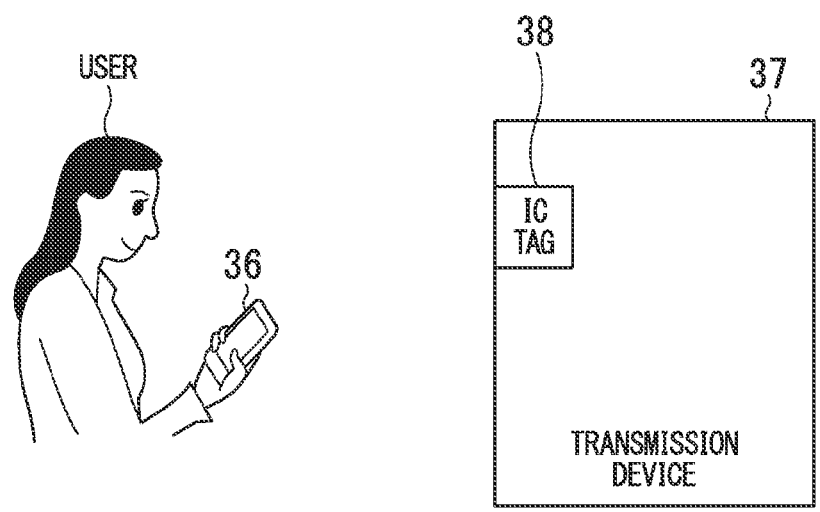
FIG. 11 is a diagram illustrating a process for the mobile terminal device to read identification information of the transmission device and register to the home server, the read identification information of the transmission device and user identification information while associating the identification information with the user identification.

FIG. 11 is a diagram illustrating a process for a mobile terminal device to read identification information of a transmission device and register to a home server, the read identification information of the transmission device and user identification information while associating those information with each other. It is shown in FIG. 11 that a user moves a smartphone 36 close to an IC tag (for example, an NFC tag, an RFIC tag, a barcode, or the like) 38 of a transmission device 37, so that the smartphone 36 reads identification information of the transmission device 37. Here, the IC tag 38 stores the identification information of the transmission device 37. Additionally, the smartphone 36 is one example of devices that can read the IC tag 38, and the smartphone 36 reads the IC tag 38 using an adequately selected wireless LAN.

In this case, the smartphone 36 registers to the home server 200, the read identification information of the transmission device 37 (hereinafter also referred to as "transmission device ID") and user identification information while associating those information with each other. The transmission device 37 may inform the home server 200 or each signaling device 300-*i* of signaling order information (for example, a signaling order indicating completion of washing) and the transmission device ID. Alternatively, even if the transmission device 37 is not connected to the network, the home server 200 may estimate the signaling timing, thereby transmitting the signaling order information (for example, a signaling order indicating completion of washing) to each signaling device 300-*i*.

Figure 12:
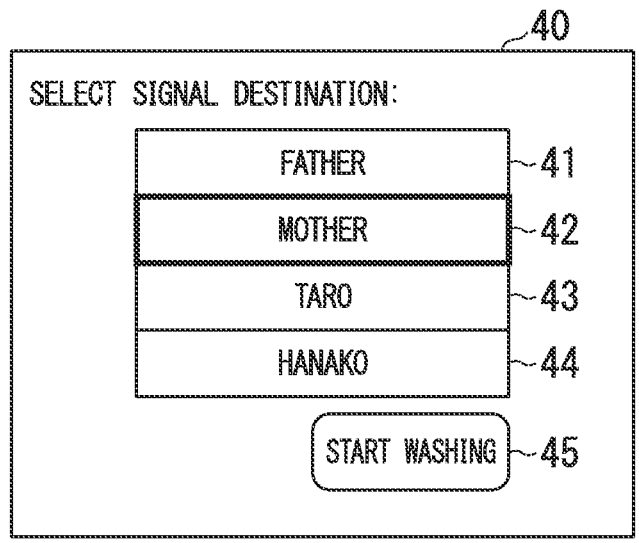
FIG. 12 is a diagram illustrating one example of a user interface of a washing machine which selects a signal destination.

FIG. 12 is a diagram illustrating one example of a user interface of the washing machine 100 which selects a signal destination. FIG. 12 illustrates an example of a touch-screen display 40 provided on the washing machine 100. On the display 40, Father 41, Mother 42, Taro 43, and Hanako 44 are selectably displayed. In this example, Mother is selected. When a selection button 45 is pressed in this state, the washing machine 100 initiates washing. Thus, a user manually selects on the transmission device, a user to be signaled of a message, so that the transmission device transmits user identification information of the selected user to the home server 200. Thus, the home server 200 can read and specify the signaling device 300-$i$ to signal a message, based on the user identification information of the user to be signaled of the message.

In the present embodiment, the process for the communication unit (second obtaining unit) 342 included in the microwave 300-2 to obtain the user identification information is one example, and the user identification information may be obtained as follows.

Figure 13:
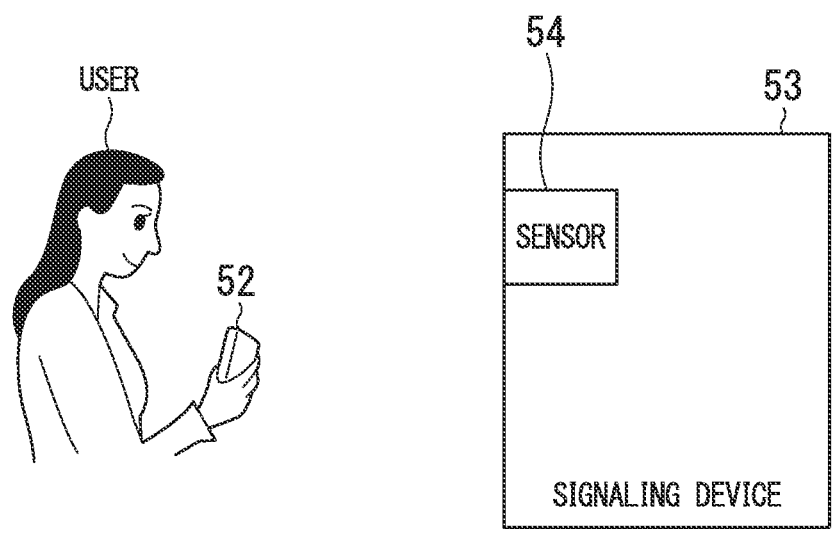
FIG. 13 illustrates an example where user identification information is obtained using a remote control.

FIG. 13 illustrates an example where user identification information is obtained using a remote control. It is shown in FIG. 13 that a user operates a remote control 52 so that a sensor 54 of a signaling device 53 obtains user identification information.

The remote control 52 for operating the signaling device 53 can specify a user. Here, the remote control is one having a remote control function as an application for a smartphone for personal use of a user. Here, the remote control may be a remote control that is identifiable by fingerprint authentication. In this example, the remote control 52 transmits to the sensor 54 of the signaling device 53, user identification information along with operation information. Here, the sensor 54 is, for example, a wireless interface or a light receiving unit. Thus, the signaling device 53 can identify who is using the remote control.

Figure 14:
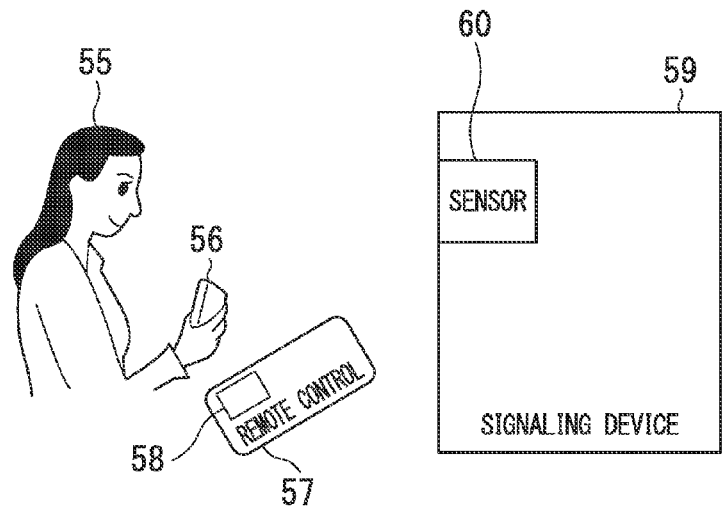
FIG. 14 illustrates an example where user identification information is obtained using a remote control including a sensor, and an ID tool.

FIG. 14 illustrates an example where user identification information is obtained using a remote control including a sensor, and an ID tool. In FIG. 14, a remote control 57 for operating a signaling device 59 includes a sensor 58. The sensor 58 reads personal information from the ID tool, so that the remote control 57 specifies a user 55 operating the remote control 57. The remote control 57 transmits to a sensor 60 of the signaling device 59, user identification information along with operation information. Thus, the signaling device 59 can identify who is using the remote control.

Additionally, in a similar manner to that shown in FIG. 12, a user of the signaling device 300-$i$ may directly input a user to be signaled of a message. Then, the signaling device 300-$i$ may transmit user identification information of the selected user to the home server 200.

Thus, in a case where at the time of performing the signaling process, the transmission device transmits to the home server 200, identification information of a user to be signaled of a message, the home server 200 has the signaling device 300-$i$, to which the user to be signaled of a message is directly input, first signal a message. Thus, the signaling device 300-$i$, to which the user to be signaled of a message is directly input, signals a message, thereby enabling the user to notice the signaling order from the transmission device.

Figure 15:
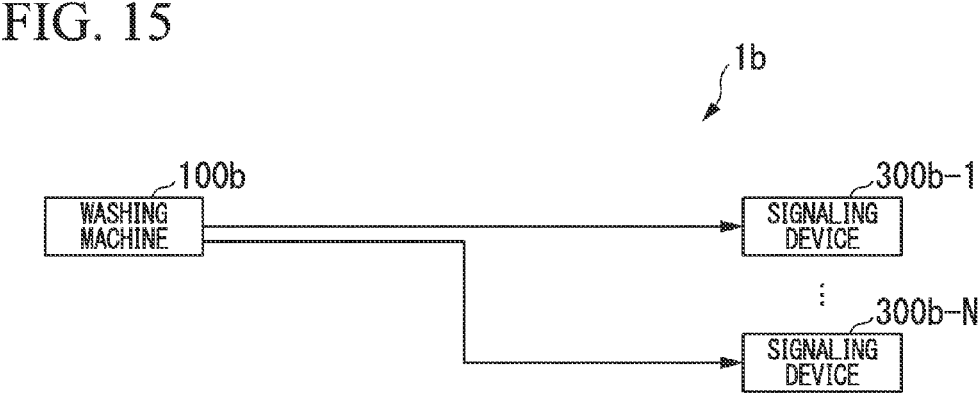
FIG. 15 is a schematic block diagram illustrating a communication system according to a first modified example.

Here, the washing machine 100 or the signaling device 300 may have the aforementioned functions of the home server 200. FIG. 15 is a schematic block diagram illustrating a communication system 1$b$ according to a first modified example. The signaling system 1$b$ includes a washing machine 100$b$, a signaling device 300$b$-1, . . . , and a signaling device 300$b$-N. Here, for example, the washing machine 100$b$ has the functions of the home server 200.

Figure 16:
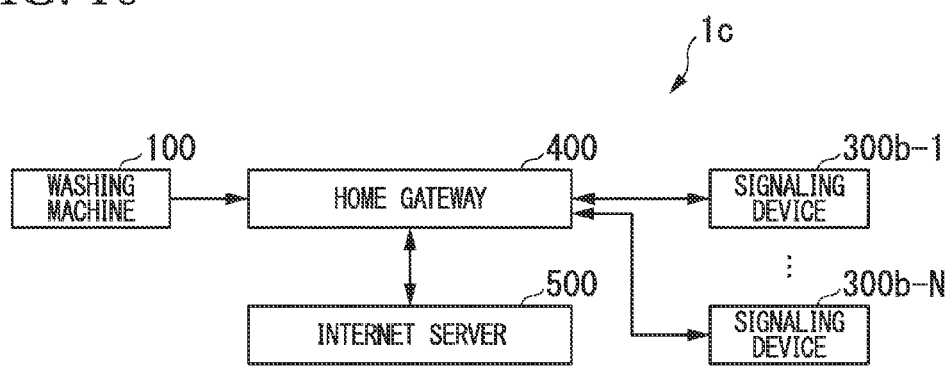
FIG. 16 is a schematic block diagram illustrating a communication system according to a second modified example.

Additionally, a server on the Internet may be used, in lieu of the aforementioned home server 200. FIG. 16 is a schematic block diagram illustrating a communication system 1$c$ according to a second modified example. The communication system 1$c$ includes a washing machine 100$b$, a signaling device 300$b$-1, . . . , a signaling device 300$b$-N, a home gateway 400, and an internet server 500. Home appliances (the washing machine 100$b$, the signaling device 300$b$-1, . . . , and the signaling device 300$b$-N) are connected to the home gateway and access the internet server 500 via the home gateway 400. Here, the home appliances are not limited thereto as long as the home appliances are connected to at least one home gateway.

At this time, the home gateway 400 obtains a list of home signaling devices and transmits the obtained list of home signaling devices to the internet server 500. The internet server 500 stores, for each user identification information, signaling device identification information that identifies a signaling device 300-$i$, as a signal destination. Thus, the internet server 500 or the home gateway 400 can generate, for each user, a list of signaling devices.

Additionally, although it has been described in the present embodiment that each device specifies an IP address and transmits information, the configuration is not limited thereto. Each device may specify another identifier that identifies a signaling device and transmit information.

Further, programs for the signaling systems (1, 1$b$, 1$c$) of the present embodiment to perform each process may be stored in a computer-readable recording medium, so that a computer system can read and execute the program stored in the recording medium, thereby performing the aforementioned various processes for the signaling systems (1, 1$b$, 1$c$).

Here, the "computer system" may include an OS and hardware such as a peripheral device. Additionally, the "computer system" may include a WWW system that provides homepage providing or displaying environments in a case where a WWW system is used. Additionally, the "computer-readable recording medium" means storage mediums such as a flexible disk, a magneto optical disk, a ROM, a rewritable non-volatile memory, for example, a flash memory, a portable medium, for example, a CD-ROM, or a storage device, for example, a hard disk built in a computer system.

Moreover, the computer-readable recording medium may also include a medium that temporarily stores a program, such as a volatile memory included in a computer system which serves as a server or client when the program is transmitted via a network such as the Internet, or a communication line such as a telephone line. Additionally, the above program may be transmitted from a computer system storing that program in a storage device thereof to another computer system via a transmission medium or by carrier waves passing through a transmission medium. The "transmission medium" that transmits the program means a medium having a function of transmitting information, such as a communication network, for example, the Internet, or a communication line, for example, a telephone line. Further, the above program may be a program for implementing part of the aforementioned functions. Moreover, the above program may be a program that can implement the aforementioned functions in combination with the program already stored in the computer system, that is, a differential file (differential program).

Although the embodiments of the present invention has been described above, specific configurations are not limited thereto, and may include designs or the like made without departing from the scope of the invention.

INDUSTRIAL APPLICABILITY

The present invention is applicable to a home server system or the like.

DESCRIPTION OF REFERENCE NUMERALS 1, 1$b$, 1$c$: signaling system
100, 100$b$: washing machine (first device)

110: storing unit
120: input unit
130: control unit
140: communication unit
150: motor driving unit
160: motor
170: reading unit (first obtaining unit)
180: display unit
200: home server (server device)
210: storing unit
220: input unit
230: control unit
231: specifying unit
232: storing control unit
233: retrieving unit
235: signaling control unit
240: communication unit
300-1: mobile terminal device
371: NFC card unit
300-2: microwave
300-i, . . . , 300-N, 300b-1, . . . , 300b-N: signaling device (second device)
310, 311, 312: storing unit
320, 321, 322: input unit
330, 331, 332: control unit
340: communication unit
341: wireless communication unit
342: communication unit (second obtaining unit)
350, 351, 352: signaling unit
360: reading unit (second obtaining unit)
372: heating unit
400: home gateway
500: internet server

The invention claimed is:

1. A signaling system comprising:
a first device;
a second device; and
a server device,
wherein the first device comprises:
a first obtaining unit configured to obtain user identification information that identifies a user; and
a communication unit configured to transmit to the server device, signaling order information indicating a signaling order, and the user identification information obtained by the first obtaining unit,
wherein the second device comprises:
a second obtaining unit configured to obtain the user identification information; and
a communication unit configured to transmit to the server device, the user identification information obtained from the second obtaining unit,
wherein the server device comprises:
a communication unit configured to receive the signaling order information and the user identification information from the communication unit of the first device and to receive the user identification information from the communication unit of the second device;
a specifying unit configured to specify, as a particular signaling device that signals a message, a second device including the second obtaining unit receiving the same user identification information as received by the first obtaining unit; and
a signaling control unit configured to have the particular signaling device specified by the specifying unit signal a message based on the signaling order information,
wherein the specifying unit of the server device comprises:

a storing control unit configured to have the storing unit store in the storing unit, the user identification information received from the second device and signaling device identification information that identifies the second device while associating the user identification information with the signaling device identification information; and
a retrieving unit configured to retrieve from the storing unit, signaling device identification information associated with one user identification information selected from one or a plurality of user identification information and transmitted from the first device,
wherein the communication control unit of the server device is configured to have the communication unit transmit the signaling order information to a signaling device identified by the signaling device identification information retrieved by the retrieving unit.

2. The signaling system according to claim 1, wherein the second device includes a motion detecting unit configured to detect that a person is present within a predetermined area, and
the specifying unit is configured to, in a case that the motion detecting unit detects presence of a person, specify as the particular signaling device, the second device including the motion detecting unit.

3. The signaling system according to claim 1, wherein the second device is configured to include in a message to be signaled, information indicating that the first device is a signal source, and signal the message.

4. A signaling method for a server device, the signaling method comprising:
receiving from a first device, signaling order information indicating a signaling order, and user identification information which identifies a user and is received by the first device;
receiving from a second device different from the first device, the user identification information that the second device receives from the first device;
specifying, as a particular signaling device that signals a message, a second device receiving the same user identification information as received by the first device; and
having the particular signaling device specified signal a message based on the signaling order information,
wherein specifying the second device as the particular signaling device comprises:
storing the user identification information received from the second device and signaling device identification information that identifies the second device while associating the user identification information with the signaling device identification information; and
retrieving from the storing unit, signaling device identification information associated with one identification information selected from one or a plurality of user identification information and transmitted from the first device,
wherein having the particular signaling device specified signal the message comprises transmitting the signaling order information to a signaling device identified by the signaling device identification information retrieved.

5. The signaling system according to claim 1, wherein the first obtaining unit of the first device is configured to receive the user identification information,
the communication unit of the first device is configured to transmit the signaling order information and the user identification information to the server device, the second obtaining unit of the second device is configured to receive the user identification, and the communication unit of the second device is configured to transmit the user identification information to the server device.

* * * * *